United States Patent [19]
Shaver et al.

[11] 3,887,710
[45] June 3, 1975

[54] SYNERGIZED CARBAMATE INSECTICIDE

[75] Inventors: Henry W. Shaver, New York; William Schmidt, Sea Cliff; Murray W. Winicov, Flushing, all of N.Y.

[73] Assignee: West Laboratories, Inc., Long Island City, N.Y.

[22] Filed: Apr. 19, 1972

[21] Appl. No.: 245,624

[52] U.S. Cl. ................ 424/300; 424/278; 424/312
[51] Int. Cl. .............................................. A01n 9/20
[58] Field of Search ............ 424/300, 278, 195, 95, 424/312

[56] References Cited
FOREIGN PATENTS OR APPLICATIONS
676,776    8/1952    United Kingdom OTHER PUBLICATIONS
Pesticide Index, Frear, p. 49, 4th ed., (1969).
Chemical Abstracts, 75:75266y (1971).

*Primary Examiner*—Albert T. Meyers
*Assistant Examiner*—Leonard Schenkman
*Attorney, Agent, or Firm*—Howard E. Thompson, Jr.

[57] ABSTRACT

New and improved insecticidal compositions are provided from the group of insecticides generally referred to as "carbamate type" insecticides, when these carbamate insecticides are combined with selected synergists. The novel insecticidal compositions are particularly effective against non-flying insect pests and exhibit superior residual kill activity against such pests over unsynergized compositions.

2 Claims, No Drawings

SYNERGIZED CARBAMATE INSECTICIDE

This invention relates to new and improved carbamate-type insecticidal compositions which contain selected synergists. The insecticidal compositions are particularly effective against non-flying insect pests such as roaches and exhibit superior residual kill activity against such pests.

BACKGROUND OF THE INVENTION

A great deal of prior art exists pertaining to synergized insecticide formulations useful against flying insects but little prior art exists relating to synergized insecticides useful against non-flying insects such as roaches. The former type insecticide usually comprises pyrethrins which are employed with certain synergists such as piperonyl butoxide (PBO), piperonal bis (2-(2-butoxy-ethoxy)ethyl) acetal available under the Trademark "Tropital," N-octyl bycycloheptene dicarboximide, available under the Trademark "MGK-264," N-octyl sulfoxide of isosafrole, known as "Sulfoxide," and the like.

Previous attempts have been made to employ such synergists with pyrethrins to provide an insecticide useful against non-flying pests. Typical of the literature directed to this type insecticide is that authored by Eileen J. Incho, entitled *Ratios of PBO and Pyrethrins for German Cockroach Control*, Soap and San. Chem., February, 1952.

Some of the residual type insecticides which have been used against non-flying insect pests are based on carbamates such as o-isopropoxy-phenyl methylcarbamate, available under the Trademark "Baygon," 2-(1,3 dioxolane-2-yl)-phenyl-N-methyl carbamate, available under the Trademark "Famid," and the like. Prior art literature relating to the use of synergists in such insecticide compositions, however, is scant since the use of synergists in this type of insecticide does not appear to have the same degree of effectiveness as those used with the pyrethrins. An interesting article relating to this observation is that authored by J. C. Keller, et al. entitled *Susceptibility of Insecticide-Resistant Cockroaches to Pyrethrins*, in "Pest Control," November, 1956.

Although the list of commercially available organic insecticides, both proven and experimental, is extensive (See *Bulletin of the Entomological Society of America*, vol. 12, No. 2, pp. 161-217, June, 1966), there are few that are completely effective against non-flying insect pests; that is, which are not only effective for their intended use, but which are safe and commercially feasible.

THE INVENTION

It has now been found that improved carbamate-type insecticides can be provided which are effective against non-flying insect pests and yet are safe to use and are commercially feasible. According to the present invention, these insecticides can be obtained by providing an insecticidal composition which generally comprises a carbamate and, as selected synergists, piperonyl butoxide (PBO), piperonal bis (2-(2-butoxyethoxy)ethyl) acetal ("Tropital") and a vegetable oil or fat. The selected synergists, added in proper amounts, significantly improve the "knockdown" and "mortality" rate of known prior art carbamate-type insecticides employed against non-flying, or crawling, insects and pests.

As employed throughout this disclosure and in the appended claims, it should be understood that the term "carbamate-type insecticides" is intended to refer to those carbamate-containing compositions generally employed as insecticides including, but not limited to, the carbamates referred to hereinabove and identified by their Trademarks as "Baygon" and "Famid" and which typically contain extenders, such as hydrocarbon solvents, perfumes, and solubilizing agents.

The terms "fat" and "vegetable oil" as employed throughout this application, including the appended claims, should be understood as referring to those fats and oils present as glycerides and falling within the definition of fats as being "A glycerol ester of fatty acid(s): Fats generally are substances of plant and animal origin. Fat may be in solid form, as tallow, lard, butter, margarin or other shortenings, or in liquid form, as vegetable oils."

The glycerol esters are predominately of the triglyceride type, although vegetable oils and fats may also contain some di- and even mono-glycerides. The fatty acid component of fats and vegetable oils encompass the range of fatty acids containing from about 8 to 22 carbon atoms, primarily in the range of $C_{12}$ and $C_{18}$. Although most of the fatty acid content is saturated linear alkanoic acid, some of the fatty acid content may be unsaturated, as exemplified by oleic and linoleic acid. Examples of fats and oils suitable for the purpose of our invention are coconut oil, peanut oil, corn oil, cottonseed oil, olive oil, soybean oil, sesame oil, tallow, butter fat, etc.

Although fats naturally obtainable in solid form can be utilized in the insecticidal composition of the invention, those which are normally liquid at room temperature, such as the vegetable oils, are preferred, and of these, coconut oil is particularly preferred.

To obtain the insecticidal composition of the invention, a typical carbamate-type insecticide formulation is first dissolved in a suitable solvent, to which the particular synergist combination of the invention is added and blended therein by stirring, either manually or by means of an appropriate mechanical stirrer, until a homogeneous mixture is obtained. The synergist composition can either be uniformly blended before being added to the carbamate-type insecticide formulation, or each synergist comprising the synergist composition can be added separately thereto. The procedure followed is not critical as essentially the same results will be obtained.

With respect to the synergists employed, it has been found that they should each be present in the insecticidal composition in an amount no less than about 0.5% by weight, based upon the total weight of the composition when it contains 1% carbamate insecticide. Stated in another way, the ratio of synergists employed to carbamate insecticide should be no less than 0.5:1. For optimum results of insecticide effectiveness and economic production, the synergists of this invention should be present at a ratio range of from about 0.5:1 to 5:1. Although greater amounts of all synergists can be employed, it has been found that the performance of the insecticide is not materially improved.

The carbamate-type insecticidal composition of the invention was subjected to comparative analyses wherein a carbamate insecticide formulation without synergists and formulations containing varying amounts of the particular synergists of the invention as well as others containing different synergists were utilized. The results for the comparative analyses were obtained based on a modification of the *Tentative Cockroach Residual Test Method* as prescribed by a subcommittee of "Chemical Specialties Manufacturers Association" (CSMA), an outline of the test method being set forth below:

Test Insect

The test insects shall be healthy, normal undeformed adult males of the German cockroach *Blattella germanica* (linn.). Recently emerged adult males, e.g., those whose pigmentation is not dark, shall not be used for testing purposes. It is recommended that the adult stage shall have been attained at least three days and not more than 30 days prior to testing.

Testing Room

This room may be of any convenient size permitting adequate space for the operator to handle the test and equipment efficiently. While tests are being conducted this room shall be maintained at a temperature of 82°F. ± 2°F., and a relative humididty of 50% ± 5%. The tests should not be exposed to direct sunlight and in an area of relatively still air.

Test Equipment

1. Whatman No. 3 filter papers, 18.5 cm. in diameter.
2. Glass slides, 3 inches by 3 inches square.
3. 3/16 inch metal spacers.
4. Aluminum foil.
5. Lucite cylinders*, 5 inches in diameter and 2 inches high, ⅛ inch wall thickness.

(*Available from Colonial Kolonite Company, 2232 Armitage Avenue, Chicago, Ill.).

6. Suitable screen cell covers, 14 mesh stainless steel screens, 5 inches in diameter.
7. Storage containers, approximately 14 inches × 14 inches × 13 inches, and having a volume of approximately 1.6 cubic feet.

Preparation of Storage Containers

The cardboard cartons to be used for aging and storing the treated filter papers should be prepared by cutting two holes in each side 1½ inches square, approximately 1½ inches from the top of the carton and 3½ inches from the corners. A string is attached to two opposite sides, 4½ inches from the top. When in use, boxes should be sealed at the bottom with gummed paper tape. The top should be tightly closed but not sealed.

Preparation of Test Panels

Place circles of filter paper over a base of aluminum foil. Pipette 1.5 ml. of test solution over the filter paper, wetting it evenly. Treat 10 circles of filter paper with each insecticide to be tested. For each sample tested leave 2 untreated papers as controls.

Treated papers are aged in cardboard cartons for one week prior to testing. Ten filter papers, all treated with the same insecticide, are stored in one carton. Papers should be fastened to the string inside the box with paper clips and spaced approximately 1½ inches apart. Filled boxes are stored at a temperature of 82°F. ± 2°F., and a relative humidity of 50% ± 5%.

Test Procedure

Place lucite cylinders in center of each filter paper. Place 2 clean three-inch squares of glass in the center of each cylinder, one spaced 3/16 inches above the other with spacers at each corner. Position of the lower square should be marked on the filter paper to aid location in subsequent exposure.

Place 10 male cockroaches, anaesthetized with carbon dioxide, on each upper glass panel. Cover cylinders with screen covers. Test cylinders should be held in a quiet area at a temperature of 82°F. ± 2°F., and a relative humidity of 50% ± 5%. Test cylinders should not be exposed to direct sunlight.

Record dead and moribund roaches at 24 hours.

After each test, lucite cylinders, glass plates, and spacers should be removed from the treated papers and washed in a detergent and hot water. They should be placed in storage until the succeeding test. Between tests, treated filter papers will be stored in their respective storage cartons and held under conditions identical to storage during the first week aging.

The carbamate-type insecticide of the invention will become more clear when considered in light of the following Examples which are set forth as being illustrative and should not be construed as being limitative of the invention. Unless otherwise indicated, all parts and percentages are by weight.

EXAMPLE 1

A plurality of insecticidal compositions were prepared containing various amounts of synergists. The efficacy of these compositions were then determined according to the CSMA test procedures described hereinabove. The results obtained are tabulated below wherein the basic, carbamate-type insecticide formulation shown therein and identified by the letters "S.C." consisted of the following components and ingredients:

| Component | % by weight |
|---|---|
| o-isopropoxyphenyl methylcarbamate (Baygon) | 1.05 |
| Butyl Cellosolve | 15.00 |
| perfumed deodorizer | 0.20 |
| deodorized kerosene | 83.75 |
| | 100.00 |
| Specific gravity at 60°F. — 0.798 | |
| Weight — 6.65 lbs./gal. | |

TABLE 1

Efficacy of Carbamate-Type Insecticides as Determined by Modified CSMA Test Method

| Insecticide Composition | | | Residue Age (days) | Knockdown 1 hr. | 2 hrs. | Mortality in 24 hrs. |
|---|---|---|---|---|---|---|
| (1)* | S.C. | (no synergists added) | 1 | 23% | 38% | 91% |
| | | | 7 | 2% | 10% | 66% |
| (2) | S.C. + | 2% Tropital | 1 | 44% | 66% | 95% |
| | | | 7 | 5% | 17% | 75% |
| (3) | S.C. + | 2% PBO | 1 | 50% | 67% | 92% |
| | | | 7 | 18% | 29% | 83% |

TABLE 1—Continued

Efficacy of Carbamate-Type Insecticides as
Determined by Modified CSMA Test Method

| Insecticide Composition | | | Residue Age (days) | Knockdown 1 hr. | 2 hrs. | Mortality in 24 hrs. |
|---|---|---|---|---|---|---|
| (4) | S.C. + | 1/2% Coconut oil | 1 | 40% | 80% | 100% |
| | | | 7 | 8% | 36% | 90% |
| (5) | S.C. + | 1% Tropital and | 1 | 48% | 65% | 96% |
| | | 1% PBO | 7 | 10% | 20% | 80% |
| (6) | S.C. + | 1% Tropital and | 1 | 50% | 74% | 98% |
| | | 1% Coconut oil | 7 | 10% | 26% | 83% |
| (7) | S.C. + | 1% PBO and | 1 | 48% | 76% | 98% |
| | | 1% Coconut oil | 7 | 12% | 28% | 84% |
| (8) | S.C. + | 1% Tropital, | 1 | 58% | 80% | 100% |
| | | 1% PBO | 7 | 16% | 34% | 85% |
| | | 1% Coconut oil | | | | |
| (9) | S.C. + | 2% Coconut oil | 1 | 46% | 60% | 100% |
| | | | 7 | 24% | 50% | 92% |
| (10) | S.C. + | 2% Tallow | 1 | 44% | 52% | 98% |
| | | | 7 | 18% | 37% | 77% |
| (11) | S.C. + | 2% Olive Oil | 1 | 44% | 59% | 100% |
| | | | 7 | 25% | 51% | 91% |
| (12) | S.C. + | 2.5% Peanut Oil | 1 | 43% | 62% | 99% |
| | | | 7 | 21% | 40% | 88% |

*Average of 5 separate runs

EXAMPLE II

An emulsifiable concentrate, suitable for dilution with water, was prepared containing:
13.9% Baygon
15.0% Emulsifier qs 100% with trichloroethylene/methylene chloride as solvent at a ratio of 37:27, respecitvely.

A second concentrate was prepared, in which 7% coconut oil was incorporated in the formula, replacing a similar portion of the solvent.
13.9% Baygon
7.0% Coconut oil
15.0% Emulsifier qs 100% with trichloroethylene/methylene chloride as solvent at a ratio of 37:27, respectively.

Dilutions of each composition in water were made to provide 1% active Baygon, and both dilutions were then tested using the tenative CSMA insecticidal test method described above. The second formula, containing the coconut oil, gave distinctly superior performance with respect to both knockdown and 24 hour mortality, compared with the first formula.

From the Examples shown hereinabove, it can be seen that the efficacy of carbamate-type insecticides is materially and significantly improved when the synergists of the invention are incorporated therein. This is dramatically represented by the results shown in Table I.

In lieu of employing the carbamate "Baygon," the carbamate "Famid" can be utilized to prepare insecticidal compositions of the invention and some representative formulations incorporating Famid are illustrated in Table II below.

TABLE II

| Composition Ingredients | Amount in Composition (% by wgt.) | | |
|---|---|---|---|
| | A | B | C |
| Famid | 1 | 1 | 1 |
| Coconut oil | 1 | 0 | 0 |
| Piperonyl butoxide | 0 | 2 | 0 |
| Piperonal bis (2(2-butoxy ethoxy) ethyl) acetal | 0 | 0 | 2 |
| Solvent: 1,1,1-trichloroethane/ deodorized kerosene at a ratio of 4:1, respectively | 98 | 97 | 97 |

While the insecticidal composition of the invention has been described with particularity and in some detail, it should be understood that it is subject to changes, modifications and variations within the scope of the invention.

What is claimed is:

1. An insecticidal composition for use against non-flying insect pests comprising the carbamate insecticide o-isopropoxyphenyl methylcarbamate and a synergist which is a glycerol ester of $C_8$ to $C_{22}$ fatty acids, the proportions of said synergist to said carbamate insecticide being within the range of about 0.5:1 to 2.5:1 on a weight basis.

2. The insecticidal composition of claim 1 wherein said synergist is coconut oil.

* * * * *